MACHINE FOR ROOTING HAIR

Original Filed Aug. 26, 1953 3 Sheets-Sheet 1

INVENTOR.
LAWRENCE EDGAR HALL.
BY Hubbell and Cohen
ATTORNEYS

MACHINE FOR ROOTING HAIR

Original Filed Aug. 26, 1953 3 Sheets-Sheet 2

INVENTOR,
LAWRENCE EDGAR HALL.

BY Hubbell and Cohen

ATTORNEYS

MACHINE FOR ROOTING HAIR

Original Filed Aug. 26, 1953 3 Sheets-Sheet 3

INVENTOR.
LAWRENCE EDGAR HALL.
BY Hubbell and Cohen
ATTORNEYS

United States Patent Office

Re. 24,546
Reissued Oct. 7, 1958

24,546

MACHINE FOR ROOTING HAIR

Lawrence E. Hall, Flushing, N. Y.

Original No. 2,686,305, dated August 10, 1954, Serial No. 376,545, August 26, 1953. Application for reissue August 8, 1956, Serial No. 603,467

14 Claims. (Cl. 112—79.5)

Matter enclosed in heavy brackets [ ] appears in the original patent but forms no part of this reissue specification; matter printed in italics indicates the additions made by reissue.

This invention relates broadly to an attachment for a chainstitch type sewing machine mechanism whereby such mechanism may be used for rooting air into the scalp of a doll made of resilient material such as vinyl plastic or other such compositions. The present application is a continuation in part of my application "Attachment for Sewing Machine," filed on October 24, 1952, under Serial No. 316,710, now abandoned.

In the doll manufacturing industry it is now common practice to manufacture dolls of resilient, rubber-like material such as the composition known as vinyl plastic and other similar compositions. Whereas it was formerly possible to glue or otherwise secure a wig upon the exterior of a doll's scalp, such method of attaching hair is not possible nor desirable where the head is made of a rubber-like substance. Where such compositions are used, it is necessary to cause the hair to penetrate the scalp and to be fixedly secured throughout the interior of the scalp.

Toward that end, a conventional chain-stitch producing sewing machine mechanism may be used effectively, such a mechanism having a high post and a vertically reciprocating hooked needle. However in using such mechanism, a problem presents itself. The hooked needle, at substantially the beginning of its downward stroke, will engage a quantity of strands of simulated hair and draw them downwardly through the scalp where they will be locked permanently. The needle will then advance upwardly again and at the beginning of its downward stroke engage substantially another quantity of hair and draw it downwardly through and lock it against the interior of the scalp. In so doing, since each strand of simulated hair is engaged by the needle midway of its length and drawn through and locked against the interior of the scalp in that manner, permitting the free ends of the strands of hair to extend upon the exterior of the scalp, it will engage some of the free ends of hair already rooted and draw them through the scalp. After several quantities of hair have been rooted, the hair will become completely snarled, and the mechanism will either be unable to produce a complete head of hair or, if a head of hair is produced, the product will be unsightly and unfit for commerical use.

It is therefore the principal object of the present invention to provide an attachment for a high[-]post chain-stitch producing sewing machine mechanism, which will brush aside the free ends of rooted hair, so that such free ends cannot again be engaged by the needle.

It is a further aim of the present invention to provide an attachment for a sewing machine mechanism of this character, the attachment having a plurality of spaced-apart openings near its outer edge, through which the vertically reciprocating needle draws successive quantities of hair in such a manner that the free ends of the hair engaged by the hooked end of the needle will be brushed aside and out of the path of the reciprocating needle.

And yet another purpose of the present invention resides in the provision of a method for rooting strands of simulated hair to the interior of the scalp of a doll, the hair being rooted between the two ends of each strand, which may be accomplished by machinery having an attachment which brushes the free ends of rooted hair out of the path of the vertically reciprocating needle of the mechanism. And a still further advantage of the present invention resides in the provision of a doll's head in which hair, which is drawn through the scalp, is lock-stitched to the interior of the scalp, each strand of hair being lock-stitched between its two ends, the loose ends of lock-stitched hair which extend upon the exterior of the scalp being free for combing and dressing.

These and other meritorious aims and objects, which will become more fully apparent as the description hereof proceeds, are attained by the novel construction, combination and arrangement of parts, hereinafter described, and illustrated in the accompanying drawing, forming a material component of the presvent disclosure, and in which.

Figure 2:
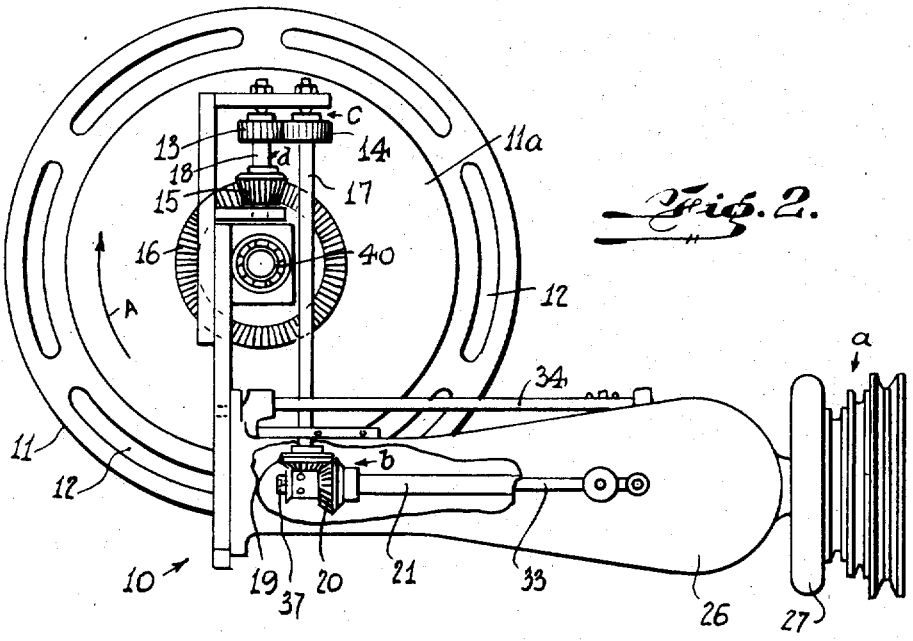
Figure 2 is a top plan view of Figure 1 showing the mechanical relationship between the attachment of the present invention and the machine head.

Referring in greater detail to the drawing, the numeral 10 illustrates in general a high post, chain-stitch producing sewing machine mechanism having a vertically reciprocating hooked needle, in connection with which the attachment of the present invention is used.

Figure 1:
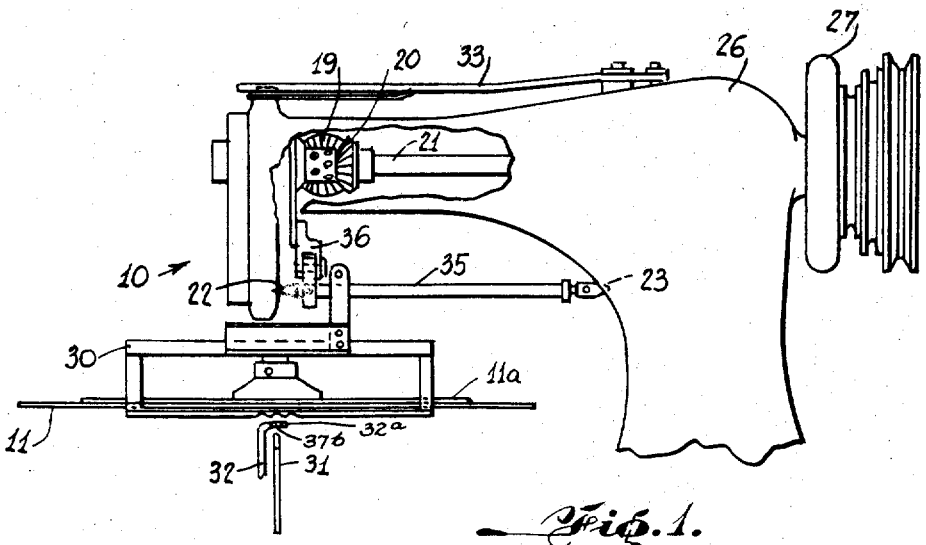
Figure 1 is a side elevational view of the head of a conventional chain-stitch producing sewing machine mechanism provided with an attachment which constitutes the present invention.

The sewing machine mechanism further comprises a [conventional] presser foot 30 comprising a pair of spaced-apart horizontal bars and two spaced-apart vertical bars, as is illustrated in Figure 1 of the drawings. Rotatably mounted slightly above the lower horizontal bar of presser foot 30 and adapted to rotate horizontally is the attachment 11 of the present invention. Attachment 11 is a disc made of steel or any other suitable and desirable material. Centrally of disc 11 there may be provided a much smaller reenforcing disc 11a. Disc 11 is provided near its outer edge with a plurality of spaced-apart elongated [periferal] *peripheral* slots 12, the purpose of which will hereinafter be more fully described. While the preferred rotative movement of disc 11 is in a clockwise direction, it may be so mounted that it will rotate in the opposite direction if desired.

Centrally of disc 11 is a *bevel* gear 16 in mesh with *another bevel* [a spur] gear 15 of smaller diameter. For the purpose of the present disclosure, gear 16 is 6 times larger than gear 15. Gear [14] *15* is mounted at one end of a shaft 18, shaft 18 carrying a gear 13 near its other end. Gear 13 is in mesh with a gear 14 rotating in the opposite direction, the said gear 14 being mounted near one end of a shaft 17 extending parallel to shaft 18. At its other end, shaft *17* [18] is provided with a [horizontally rotating] *bevel* gear 19 in mesh with a [vertically rotating] bevel gear [19] *20* on shaft 21, which is the main drive shaft of the mechanism 10.

The conventional housing of the conventional mechanism is referred to by the numeral 26 and the pulleys by which motion is imparted to shaft 21 are referred to by the numerals 27. The presser foot of the mechanism, which is not part of the present invention *per se* is referred to by the numeral 30. Presser foot 30 has secured thereto a conventional lifter rod 34 which is spring controlled as at 33. Also part of any conventional machine of this type is a post 32 having a rectangularly bent upper end 32a upon which a work piece rests while work is performed thereon, member 32a having an opening 32b therein, as is illustrated in Figure 1 of the drawings.

Extending below shaft 21 and parallel thereto is a rocker 35 axially rotating in a bearing 23 at one end, and a bearing 22 at its other end.

In mesh with gear 19 is a bevel gear 37 rotating vertically, which has secured thereto by screws or otherwise an [excentric] *eccentric* disc 84 having openings therein. A rocker arm 80 is adapted to be retained at one of its ends 85 in one of said openings by means of a screw 86 or otherwise, the other end of arm 80 having an elongated slot 82 therein for the passage of a screw 83 therethrough and through an elongated slot at one end of another arm 81, the other end of arm 81 having a screw opening therein for the passage of a screw 35a therethrough and through the elongated slot at one end of an arm 77, said arm 77 *being* disposed angularly with respect to arms 80 and 81. Substantially at its center, arm 77 is secured to rocker 35. Near its other end, arm 77 is provided with an elongated slot 82 for the passage of a pin 79 or other retaining means therethrough and through an elongated slot at one end of an arm 78, the other end of the said arm 78 having secured thereto in any suitable and desirable manner, a feeder broadly referred to by the numeral 45.

Feeder 45 may be made from a unitary piece of material such as metal, bent upon itself to form a bottom, a front portion and a cover portion 46. In its open rear a counter-weight 47 may be provided, actuated by spring 44a, by which hair is advanced toward the front of the feeder. Centrally of the front of the feeder, there may be provided an opening 50 through which the hooked end of needle 31 may pass and engage successive quantities of hair in the feeder, and draw them from the feeder, the hair being positioned in strands *extending* horizontally across the feeder, as is illustrated at 44 in Figure [6] *8*, the illustration also showing that the hooked end of needle 31 engages each strand of hair substantially midway its length. Slot 48, in which *a* pin 49 may be retained, aids in the [forward] movement of the hair *toward opening 50* and also in retracting the weight when the feeder is devoid of hair.

Figure 10:
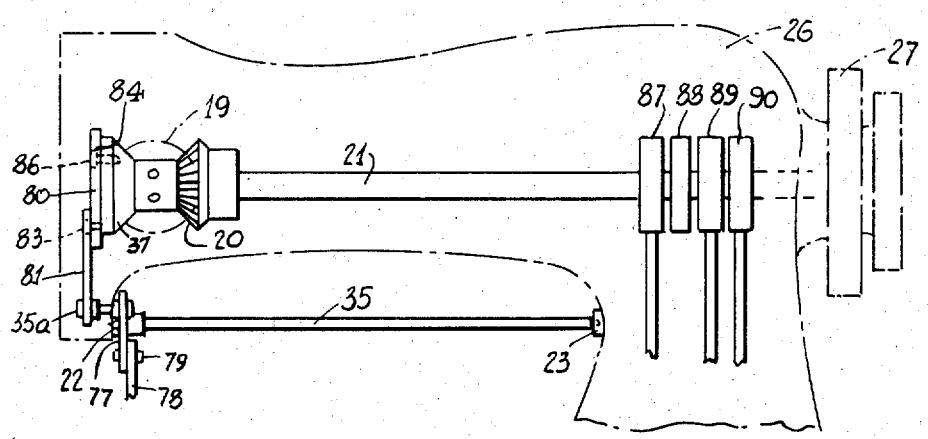
Figure 10 is a side elevational view of the head of a mechanism of the type herein referred to, showing how the rocking motion of the feeder is achieved.

In Figure 10 of the drawings, *a* cast-off cam 87, *a* presser foot cam, *a* needle cam 89 and *a* feed cam 90 are illustrated. [This is standard equipment of] *These are standard elements in* machines of the type herein [refered] *referred* to, the cast-off cam 87 controlling the operation of a pair of cast-offs 75 and 76, respectively, which hold the stitch on the interior of the scalp until the next stitch has been made, so as to prevent slipping[.] *, the presser foot cam 88 controlling the movement of the presser foot 30, the needle cam controlling the movement of needle 31 and the feed cam controlling the movement of feeder 45, all of said elements being operated in timed relation as will be described in greater detail hereinafter.*

The numeral 40 in Figure 2 refers to a conventional antifriction mounting.

Figure 9:
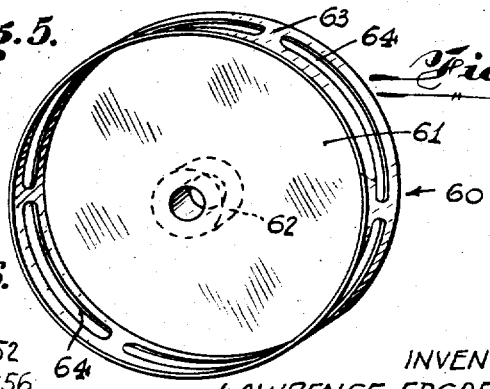
Figure 9 is an elevational view of a modified form of attachment.
Figure 6:
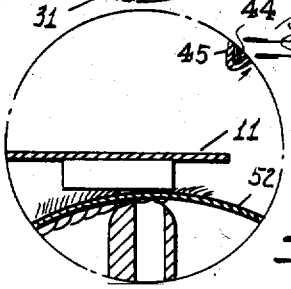
Figure 6 is a detail view of the final step in the hair rooting process, the illustration showing the free ends of rooted hair having been brushed out of the path of the needle about to begin its upward stroke again.
Figure 7:
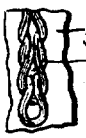
Figure 7 is a sectional view of a portion of scalp having rooted hair therein, showing the chain-stitch produced by the mechanism, the illustration being drawn to an enlarged scale.

[There is illustrated in Figure 9 a modified form of attachment. The modified attachment is a drum-shaped structure 60 having a rear wall 61 and a side wall 63. Side wall 63 is provided at spaced intervals with a plurality of spaced-apart slots 64 therein, and centrally of the wall 61 there is provided a bearing 62 whereby it may be mounted in the aforesaid manner.]

The device is used in the following manner:

Counter-weight 47 is withdrawn from feeder 45 and the feeder is filled with horizontally positioned strands of pre-cut simulated hair 44, all of the strands of hair being illustrated as being of equal length. The counter-weight is then placed into position and the feeder will be found to contain sufficient hair to provide a complete head of hair for one doll, whereupon the feeder must be filled again.

Figure 3:
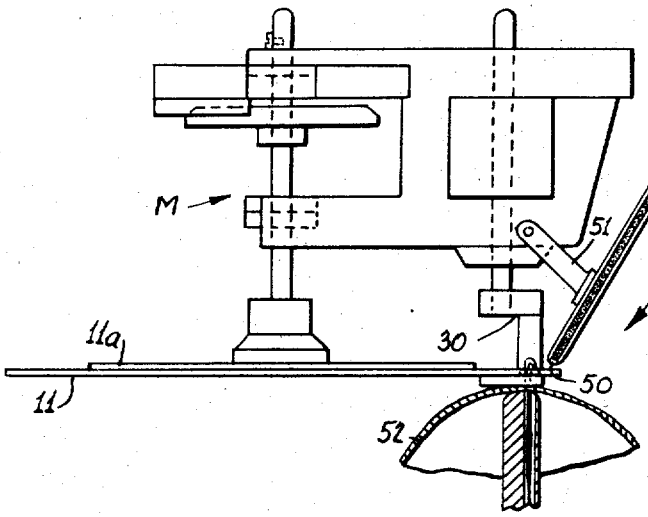
Figure 3 is a diagrammatic view of a feeder which may be used in connection with the present invention, the feeder having a quantity of strands of hair simulated therein, the illustration further showing the mechanical relationship between the feeder and the attachment which constitutes the present invention.

Thereupon the [pressure] *presser* foot 30 is raised slightly, for which purpose the mechanism is provided with a conventional lifter rod 33 which is activated by a foot pedal not shown in the drawing. The space between the lower horizontal bar of presser foot 30 and element 32a of post 32 will be sufficiently increased to permit *a doll's* scalp 52 to be [entered] *inserted* therebetween and to be placed upon the element 32a of post 32 as illustrated in Figure 3. This is done when needle 31 is in its lowermost position.

Figure 4:
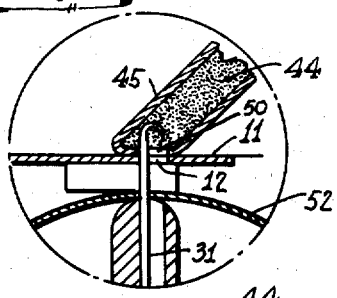
Figure 4 is an enlarged detail view of the first step in the hair rooting process, the illustration showing the hooked end of the needle about to remove a quantity of strands of hair from the feeder.
Figure 8:
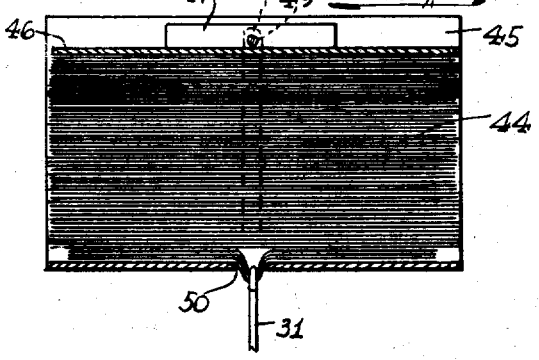
Figure 8 is a sectional view of a feeder which may be used in connection with the present invention, the feeder illustrated as having been provided with a quantity of strands of pre-cut hair, and showing the hooked end of the needle engaging a quantity of strands of hair on the feeder.
Figure 5:
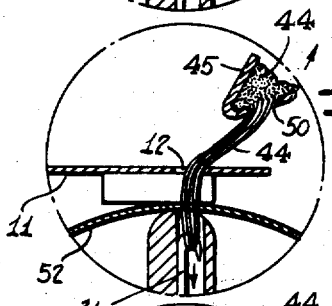
Figure 5 is an enlarged detail view of the next step in the hair rooting process, the illustration showing the needle, during its downward stroke, drawing the hair removed from the feeder in Figure 4, through one of the openings in the attachment and through the opening made in the scalp by the needle during its upward stroke.
Figure 11:
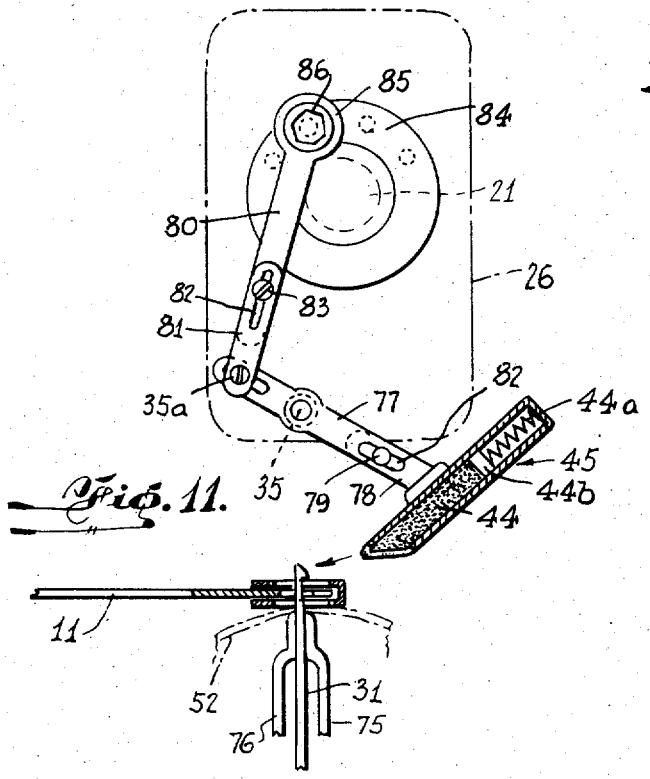
Figure 11 is a right hand end view of the machine head showing the mechanical relation of the feeder, machine head, needle and attachment.

The mechanism is then activated in the conventional manner. The vertically reciprocating needle 31 will advance upwardly and the hooked end of needle 31 will pierce an opening through scalp 52, and its upward stroke will continue through an opening in the lower bar of presser foot 30 in the conventional manner. [The timing the relative movement of disc 11 is such] *The reciprocating movement of the needle 31 and the rotation of disc 11 is so timed and coordinated* that when the needle passes through the opening in presser foot 30, one of the slots 12 of attachment 11 will be in alinement therewith. The needle will enter through the slot at the beginning of the slot, and the feeder 45 will rock forward. Figure 11 shows the needle after its hooked end has passed through one of the slots [11] *12*. In this illustration the needle 31 is [illustrated] *shown* as having advanced upwardly through the opening in the upper horizontal bar of presser foot 30 but has not completed its upward stroke. It will advance upwardly a short distance further, at which time the feeder will have reached the position illustrated in Figure 4. The hooked end of needle 31 will enter *through* opening 50 [in] *into* feeder 45 and engage a quantity of hair between the ends of each strand. The number of strands of hair engaged by the hooked end of the needle will obviously depend upon the size of the hook *and the degree of penetration of the needle into the feeder 45*. When the hooked end of the needle has engaged the hair, nut 86 by which arm 80 is secured to [excentric] *eccentric* 84 will have passed its lowermost position on disc 84 and will advance upwardly, causing feeder 45 to rock backwards. At the same time the needle will start its downward stroke and, having reached the end of the slot 12 through which it had entered, it will withdraw through that slot at the *trailing* end thereof, and draw the strands of hair engaged by the hooked end of the needle through the opening in the lower bar of presser foot 30 and through the opening in the scalp made by the needle during its upward stroke, where they will be retained by lock-stitch against the interior of the scalp, as at 56. The free ends of the hair thus rooted [which] extend [upon] *upward from* the exterior of the scalp 52 as in Figure 5, and they will be brushed away *from the needle* by the rotative movement of member 11, so that, when the needle has reached its lowest position and is about to execute an upward stroke again, the free ends of rooted hair will have been brushed out of the path of the *oncoming* needle. When the needle has reached its lowest position and is [aboout] *about* to advance upwardly again, feeder 45 will have rocked to its extreme backward position and will be about to move forward again, and the *beginning of the* next adjacent slot 12 of disc 11 will be in alinement with the needle for its hooked end to pass through. The operator guides the scalp 52 upon post 32, so that hair may be rooted wherever desired. When the head has been completed, activation of the foot pedal will raise the presser foot again, so that the scalp may be removed in the same manner in which it [has been entered] *is initially disposed thereon.*

The timing of the disc is such, that it will complete one revolution to six to-and-fro movements of the feeder and six up-and-down movements of the needle. This ratio may vary by the addition of slots in the disc or the elimination of slots therefrom, and the timing of the feeder may be altered by placing nut 86 in another opening in [excentric] *eccentric* disc 84.

*Referring now to Fig. 9, there is shown a modified form of means for engaging rooted hair and moving it away from the needle whereby to prevent re-engagement of the rooted hair by the needle. Specifically, the brushing or wiping means includes a drum 60 having a cylindrically shaped peripheral side wall 63 and an end wall 61. Mounted in the end wall 61 is a bearing 62 adapted to be mounted on a horizontal rotatable shaft (not shown). The peripheral side wall 63 is provided with a plurality of spaced elongated slots 64.*

*Drum 60 is adapted to be mounted on a horizontal shaft so that each of the slots in turn move into registry with the vertical reciprocating needle 31 to permit the needle to pass upwardly through each of the slots so as to engage the hair 44 in the feeder 45 and to move it downwardly through the slots to chain stitch it to the interior of a doll's scalp. The peripheral side wall 63 will engage the strands of hair which have been chain stitched to the interior of the doll's scalp and will move them away from the path of the oncoming needle to thus prevent re-engagement of the needle with strands of hair which already have been rooted.*

Thus there has been shown and described a simple and highly effective attachment for converting a conventional chain-stitch sewing machine into a machine suitable for rooting simulated hair into a doll's head in the preferred form of its embodiment and in one modification thereof, but it is to be understood that this disclosure is to be regarded as descriptive and illustrative only of the best known forms of the invention and not as limitative and restrictive to the exact details shown, applicant reserving the right to make such changes in his invention as may come within the scope of the appended claims without thereby departing either from the spirit or the scope thereof.

Having thus described the invention, what is claimed as new and desired to secure by Letters Patent, is:

1. In an attachment for converting a chain-stitch type sewing machine into a mechanism for rooting hair to the interior of a doll's scalp, the combination with a chain-stitch type sewing machine mechanism including a post comprising an upright having a rectangularly turned upper end upon which the scalp rests, the rectangularly turned upper end of the post having an opening therein, a vertically reciprocating, hooked needle the hook of which passes through the opening in the rectangularly turned upper end of the post to pierce the scalp during the upward stroke of the needle, a presser foot above and in alignment with the needle, the presser foot having two spaced-apart horizontal bars and a vertical bar by which the horizontal bars are joined edgewise, a feeder containing strands of pre-cut simulated hair which are successively engaged midway their length by the hooked end of the needle at the termination of its upward stroke, the needle drawing the hair downwardly through the pierced openings in the scalp during its downward stroke to lock the hair securely against the interior of the scalp portion of the head, a disc-shaped wiper rotatable horizontally above the lower bar of the [pressure] *presser* foot, and a plurality of means in said wiper through which the needle passes during its upward stroke and through which the needle draws strands of hair engaged by its hooked end during its downward stroke.

2. In an attachment for converting a chain-stitch type sewing machine into a mechanism for rooting hair to the interior of a doll's scalp, the combination with a chain-stitch type sewing machine mechanism as above described of a wiper for brushing aside the free ends of rooted hair, said wiper comprising a disc having a plurality of elongated slots at spaced intervals near its outer edge, said disc rotatably mounted above the lower bar of the presser foot of the sewing machine mechanism, the slots in said disc successively coming into alinement with the needle at the beginning of the upward stroke of the needle and passing from alinement when the needle has completed substantially half of its downward stroke.

3. An attachment for converting a sewing machine mechanism of the character described into a mechanism for rooting hair to the interior of a doll's scalp, comprising the combination with a chain-stitch sewing machine mechanism having a vertically reciprocating hooked needle, a post adjacent thereto upon which a work-piece may be placed, a presser foot having a pair of spaced-apart horizontal arms and a pair of spaced-apart vertical arms, a main horizontal drive shaft and a vertical shaft actuated thereby, of a disc having a plurality of spaced-apart elongated slots near its outer edge, said disc rotatably mounted at the lower end of the vertical shaft, the slots in said disc adapted successively to be brought into position over the needle of the mechanism, the needle successively entering each slot in said disc at the beginning of each slot during the upward stroke of the needle, a feeder containing a quantity of strands of pre-cut hair in alinement with the needle, the needle adapted to grasp and hold a quantity of strands at the beginning of its downward stroke midway the length of the strands, the needle drawing the hair downwardly through the work-piece near the end of each of the slots in said disc.

4. In an attachment for converting a chain-stitch type sewing machine into a mechanism for chain-stitching simulated hair to the interior of a doll's scalp, the combination of a chain-stitch type sewing machine mechanism including a machine head, a main drive shaft extending horizontally therethrough, a vertically reciprocating hooked needle activated by said main drive shaft, a presser foot above and in alignment with the needle, the presser foot having two spaced-apart parallel horizontal bars and a vertical bar whereby said horizontal bars are joined edgewise, each of the horizontal bars having an opening therein through which the needle reciprocates, a post beneath and spaced from the lower bar of the presser foot, the upper end of the post turned rectangularly so that the scalp of a doll may be placed thereon, the rectangularly turned end of the post having an opening therein in alignment with the openings in the horizontal bars of the presser foot through which the needle reciprocates; and a horizontally rotating member mounted between the horizontal bars of the presser foot, said rotating member activated by the main drive shaft of the mechanism, said rotating member having a plurality of spaced-apart openings adapted successively to be aligned with the needle, a hair-carrying feeder adapted to be brought successively into and out of alignment with the needle, the needle adapted during its upward stroke to enter the opening in the turned end of the post, pierce an opening in the scalp positioned thereon, pass through the opening in the lower bar of the presser foot to engage a quantity of hair in the feeder, and during its downward stroke adapted to draw the hair through the several openings and through a pierced opening in the scalp to stitch the strands of hair to the interior of the scalp.

5. An attachment [at] *as* set forth in claim 4, wherein the feeder is rockingly activated by the main drive shaft of the mechanism in such manner that the feeder will reach its extreme backward position when the needle of the mechanism has completed its downward stroke, and wherein the feeder will have reached its extreme forward position immediately after the needle has completed its upward stroke.

6. An attachment as set forth in claim 4, wherein the feeder is provided with an opening through which the hooked end of the needle enters to engage a quantity of strands of hair to be drawn downwardly through the scalp and lock-stitched to the interior thereof.

7. In an attachment for converting a chain-stitch type sewing machine into a mechanism for rooting hair into a doll's scalp, the combination with a chain-stitch type sewing machine mechanism including a post comprising an upright having a rectangularly turned upper end upon which the scalp rests, the rectangularly turned upper end of the post having an opening therein, a vertically reciprocating hooked needle passing partly through the opening in the rectangularly turned upper end of the post to pierce the scalp during the upward stroke of the needle, a presser foot above and in alignment with the needle, the presser foot having two horiozntal bars and a vertical bar by which the horizontal bars are joined edgewise, a receptacle carrying [similated] *simulated* hair from which successive portions are engaged by the needle at the beginning of its downward stroke, the needle drawing hair through the pierced openings in the scalp during its downward stroke to stitch the hair securely against the interior of the scalp; of a disc-shaped wiper, said wiper rotatable horizontally above the lower bar of the presser foot, and a plurality of means in said wiper through which the needle draws hair engaged by it during its downward stroke.

[8. The method of stitching hair to the interior of a doll's scalp which comprises the steps of arranging strands of hair above and adjacent the material to be rooted, causing the strands of hair to be carried into a position above the material to be rooted, reciprocating a hooked needle through the scalp to the hair, causing the needle to draw a quantity of strands of hair downwardly through the workpiece, chain-stitching the strands of hair to the interior of the workpiece and brushing aside the free ends of the hair extending from the exterior of the workpiece to prevent subsequent downward pull thereof by the reciprocating needle.]

[9. The method of chain-stitching strands of simulated hair to the interior of a doll's scalp which comprises the steps of vertically reciprocating the hooked end of a needle into, through and out of a doll's scalp, advancing the needle past a hair-containing feeder, causing the needle to engage strands of hair on the feeder and to draw the hair downwardly from the feeder through the scalp midway the length of the strands of hair, chain-stitching the hair to the interior of the scalp, and by mechanical means brushing the free ends of chain-stitched hair out of the path of the reciprocating needle.]

[10. The method of stitching simulated hair to the underside of a workpiece, which comprises the steps of arranging simulated hair above the workpiece, reciprocating a needle through the workpiece to the hair, causing the needle to draw strands of simulated hair through the workpiece, and stitching the strands of simulated hair to the underside of the workpiece.]

[11. The method of chain-stitching strands of simulated hair to the interior of a doll's scalp which comprises the steps of vertically reciprocating the hooked end of the needle into, through and out of a doll's scalp, advancing the needle past simulated hair, causing the needle to engage successive strands of hair and to draw the strands through the scalp, and chain-stitching the strands to the interior of the scalp.]

[12. As an article of manufacture, a doll's head having a plurality of spaced-apart pierced openings in its scalp, strands of hair-like fibre in the openings centrally of the length of each strand, the centers of the strands projecting from and lock-stitched to the interior of the scalp, the free ends of the lock-stitched hair extending upon the exterior of the scalp.]

[13. As an article of manufacture, a doll's head having a plurality of pierced spaced-apart openings throughout its scalp, a strand of hair-like fibre in each opening midway of the length of each strand, each of the strands forming a loop penetrating to the interior of the scalp, said loops lock-stitched to the interior of the scalp, and the free ends of each lock-stitched strand extending upon the exterior of the scalp for combing and dressing.]

[14. As an article of manufacture, a doll's head having a plurality of spaced-apart openings in its scalp, strands of hair-like fibre in the openings extending partly through the scalp, the parts of the strands of hair-like fibre extending through the scalp stitched to the interior of the scalp, and the free ends of the stitched fibre extending upon the exterior of the scalp.]

[15. As an article of manufacture, a doll's head having a scalp, strands of simulated hair extending partly through the scalp to the interior of the scalp, a loop formed by the part of each strand which extends through the scalp, said loops stitched to the interior of the scalp, and the free ends of the stitched strands extending upon the exterior of the scalp for combing, brushing and dressing.]

*16. An attachment for converting a sewing machine into a mechanism for rooting hair to the interior of a doll's scalp; said sewing machine having means for positioning a doll's head, a reciprocably operable needle adapted to pass back and forth through the scalp of the doll's head, and means for supplying hair to said needle so that said needle can draw the hair into said doll's scalp; said attachment comprising a disc having cut-out portions therein, said disc being adapted to be rotatably mounted on said sewing machine in a plane substantially perpendicular to the path of movement of said needle and spaced from said means for positioning the doll's scalp whereby to adapt said disc to engage said rooted hair, and means for rotating said disc in timed relation with the movement of said needle to register a cut-out portion of said disc with said needle each time said needle moves through the plane of said disc to permit said movement of said needle, said rotation of said disc in engagement with said rooted hair being effective for brushing said hair away from said needle whereby to prevent engagement of said needle with hair already rooted.*

*17. An attachment for converting a sewing machine into a mechanism for rooting hair to the interior of a doll's scalp; said sewing machine including a post adapted to be inserted inside a doll's head to position the head*

*thereon, said post being provided with a passage, a reciprocably operable needle movable relative to said post through said passage whereby to adapt said needle to pass through the scalp of a doll's head positioned on said post, and means for supplying hair to said needle, said needle being adapted to carry portions of said hair through the doll's head to root the hair on the interior thereof with other portions of said hair remaining on the outside of said scalp; said attachment comprising a disc having cut-out portions therein, said disc being adapted to be rotatably mounted on said sewing machine in a plane spaced from said post and substantially perpendicular to and intersecting the path of movement of said needle whereby to adapt said disc to engage said other portions of said hair, and means for rotating said disc in timed relation with the movement of said needle so that a cut-out portion in said disc registers with said needle each time said needle passes through the plane of said disc, whereby to permit said movement of said needle, said rotation of said disc in engagement with said rooted hair being effective for moving said hair away from said needle whereby to prevent engagement of said needle with hair already rooted.*

*18. A machine for rooting hair into a doll's scalp, said machine comprising a post having an end which is adapted to be inserted inside a doll's head for positioning the head thereof, said last mentioned end of said post having a passage therein, a reciprocably operable needle movable through said passage whereby to adapt said needle to pass through the scalp of said doll's head, means for supplying hair to said needle, a rotatable disc spaced from said end of said post and adapted to engage portions of said hair for moving the latter out of the path of movement of said needle when said disc rotates, and means for continuously rotating said disc in timed relation with said needle to prevent interference by said disc and needle with the movement of said needle and disc, respectively.*

*19. A machine for rooting hair into a doll's scalp, said machine comprising a post having an end adapted to be inserted inside a doll's head for positioning the head on said post, said last mentioned end of said post having a passage therein, a reciprocably operable needle movable through said passage in said post end to adapt said needle for passage through the scalp of a doll's head positioned on said post, for supplying hair to said needle, said needle being effective for drawing portions of hair through said scalp to the interior thereof and leaving other portions outside said scalp, a rotatable disc spaced from said end of said post and adapted to engage said other portions of said hair for moving the latter out of the path of movement of said needle when said disc rotates, said disc being provided with cut-out portions to permit said needle to move to and from said hair supplying means, and means for continuously rotating said disc in timed relation with said needle so that a cut-out portion of said disc registers with said needle when said needle moves to and from said hair supplying means, whereby to prevent interference by said disc and needle with the movement of said needle and disc, respectively.*

*20. In combination with a chain-stitch type sewing machine having a vertically extending post with a free upper end having a passage therein and a vertically reciprocably operable needle movable through said passage, a substantially horizontal rotatable disc mounted above said upper end of said post, said disc having a plurality of cut-out portions adapted to successively register with said needle, and means for rotating said disc in timed relation with the movement of said needle so that the upper end of said needle passes successively through each of said cut-out portions in said disc once and only once per revolution of said disc during the time said needle is registered with each of said cut-out portions.*

*21. In combination with a chain-stitch type sewing machine having a vertically extending post with a free upper end having a passage therein and a vertically reciprocably operable needle movable through said passage, a substantially horizontal rotatable disc mounted above said upper end of said post in a plane intersecting the path of movement of said needle, said disc having a plurality of cut-out portions adapted to successively register with said needle, and means for rotating said disc in timed relation with the movement of said needle so that the upper end of said needle passes successively through each of said cut-out portions in said disc once and only once per revolution of said disc during the time said needle is registered with each of said cut-out portions to prevent engagement between said needle and said disc.*

*22. A machine for rooting hair into the scalp of a doll's head, said machine comprising a vertically extending post with a free upper end having a passage therein and a vertically reciprocably operable needle movable through said passage so that said needle extends above said post during a part of its reciprocating path of movement, said post being adapted to be inserted into a doll's head for positioning the head thereon, a substantially horizontal rotatable disc mounted above said upper end of said post, said disc having a plurality of cut-out portions, and means for rotating said disc so that said needle registers successively with said cut-out portions in said disc during at least a portion of the time said needle is disposed above the upper end of said post, and means for feeding simulated hair to said needle from above said disc, said needle being adapted to carry said hair successively through said cut-out portions as said needle moves downwardly relative to said post to condition the hair for engagement by said rotating disc.*

References Cited in the file of this patent or the original patent

UNITED STATES PATENTS

| | | |
|---|---|---|
| 742,700 | Maussner | Oct. 27, 1903 |
| 1,186,534 | Aldworth | June 13, 1916 |
| 2,626,619 | Sievers | Jan. 27, 1953 |
| 2,636,460 | Seiderman | Apr. 28, 1953 |
| 2,667,879 | Mann et al. | Feb. 2, 1954 |
| 2,698,019 | Sotzky | Dec. 28, 1954 |
| 2,747,530 | Goldberg et al. | May 29, 1956 |
| 2,780,190 | Lenoble | Feb. 5, 1957 |